United States Patent [19]
Prakash

[11] Patent Number: 5,214,536
[45] Date of Patent: May 25, 1993

[54] ILLUMINATION DEVICE FOR A DOCUMENT LINE SCANNER

[75] Inventor: Ravinder Prakash, Concord, N.C.

[73] Assignee: International Business Machines Corporation, Armonk, N.Y.

[21] Appl. No.: 666,974

[22] Filed: Mar. 11, 1991

[51] Int. Cl.$^5$ .................................. G02B 27/14
[52] U.S. Cl. .................... 359/633; 359/629; 359/638; 362/32; 385/133
[58] Field of Search ............ 359/629, 633, 638, 639, 359/640, 618, 834; 385/133, 43, 116, 901; 362/32, 301

[56] References Cited

U.S. PATENT DOCUMENTS

| | | |
|---|---|---|
| 3,420,596 | 1/1969 | Osterberg . |
| 3,432,222 | 3/1969 | Fleicher et al. . |
| 4,093,354 | 6/1978 | Leeb ..................... 359/834 |
| 4,502,757 | 3/1985 | Kiyoshi . |
| 4,576,436 | 3/1986 | Daniel . |
| 4,660,932 | 4/1987 | Eckbreth ............... 359/629 |
| 4,930,867 | 1/1990 | Negishi ................. 359/834 |

FOREIGN PATENT DOCUMENTS

| | | | |
|---|---|---|---|
| 5540 | 1/1977 | Japan | 359/629 |
| 22023 | 2/1984 | Japan | 359/629 |
| 19101 | 1/1985 | Japan | 359/629 |
| 266506 | 10/1989 | Japan | 359/629 |
| 991347 | 1/1983 | U.S.S.R. | 359/629 |

Primary Examiner—Jon W. Henry
Attorney, Agent, or Firm—A. P. Tennent

[57] ABSTRACT

Apparatus for producing a continuous line of light for a document scanner. An incoherent light beam is directed into one surface of an optical wedge device. The light beam is repeatedly reflected, back and forth, between input and output reflective surfaces on the wedge. The output surface is only partially reflective, thereby allowing a portion of the light to escape the wedge and provide the line of light which illuminates the document. Non-parallel sides extending between the reflective surfaces are used to provide total internal reflection and concentrate all of the incoherent light beams into a smaller area, Alignment of the incoherent light beam according to a predetermined angle causes the escaping light beams to be adjacent to each other and produce a uniform and continuous line of light free from destructive interference areas.

10 Claims, 2 Drawing Sheets

ILLUMINATION DEVICE FOR A DOCUMENT LINE SCANNER

BACKGROUND OF THE INVENTION

1. Field of the Invention

This invention relates, in general, to optical systems and, more specifically, to illumination of documents in line scanners.

2. Description of the Prior Art

Document scanners are used to scan across the surface of a document and input electrical information which represents optical indicia located on the document. Basic document scanning systems can take several different forms depending upon the type of illumination and the type of pickup, or sensor, used to detect reflected light from the document. Line scanners illuminate a complete line on the document and distinguish between elements, or pixels, on the line by a suitable sensor array, such as a linear charge coupled device (CCD). In some line scanners, the illuminated line is no higher than the width of a pixel being scanned on the line. In other line scanners, the illumination line can be larger than the pixel size because only a portion of the line is focused onto a sensor area for detection, Regardless of the particular arrangement, there is a need in document line scanners to produce a predictable and constant line of continuous light across the document to provide the reflected light needed for the sensors.

Bundles of optical fibers have been used according to one prior art arrangement for providing the illumination line needed in scanners. One end of the fibers in a group, or bundle, is positioned near to a source of light energy, such as an incandescent lamp. The other ends of the fibers are spread out in the shape of the line so that the light leaving the fibers is of the desired shape. While this arrangement provides the necessary shape and dimensions, the cost of such an optical fiber bundle can be a considerable portion of the entire scanning apparatus. In the interest of economy, it is desirable to provide the line illumination with a much more economical device.

U.S. Pat. No. 4,520,757, issued on Mar. 5, 1985, discloses a light beam distributor with some similarities to the device taught by the present invention. The patented device divides a coherent laser beam into several independent and separated beams for the purpose of passing the beams through a multi-channel light modulating element and eventually irradiating a photosensitive member. Although several spots of light are produced at the same time, the result is not in a continuous line. The light beam distributor disclosed in the patent uses a reflecting coating on one side and a semi-reflecting, or transmitting-reflecting, coating on another side. This second coating is changed in thickness to equalize the attenuation rates of the outgoing light beams. This device also does not have other sides or faces oriented in a particular non-parallel fashion to condense the entering light by total internal reflection and produce a line having a height which is smaller than the original beam diameter.

For the reasons indicated, it is desirable, and an object of this invention, to provide an economical illumination device for use in document line scanners.

SUMMARY OF THE INVENTION

There is disclosed herein a new and useful wedged-shaped illumination device for use by a document line scanner. The illumination device receives an incoherent light beam from an external source and repeatedly reflects this light beam back and forth between two reflective surfaces on the device. One surface is designed to be substantially totally reflective. The other surface is designed to have a varying reflectance across the length of the device, with the degree of reflectance appropriately controlled to allow a predetermined amount of light to escape from the device to illuminate the document. The angle at which the light enters the wedged-shaped member is selected to produce exactly adjacent output beams of light which ultimately produce a continuous line of light across the document. In addition, non-parallel sides connecting the reflective surfaces are used to totally internally reflect the light within the device and condense the input light down into a smaller area for line illumination.

According to a specific embodiment of the invention, an incandescent lamp, or bulb, is used to create an incoherent light beam which is projected into a light entering region of the beam directing member. This light is reflected from a reflective layer at the output surface and from a reflective layer at the input surface of the member. The coefficient of reflectance of the output reflective layer is determined by a mathematical relationship which takes into consideration the position of the reflective layer from the light entering region and the amount of light which must pass through the reflective layer to provide uniform illumination of the document. The angle of incidence of the originating light beam with respect to the input surface of the beam directing member satisfies a predetermined relationship between the thickness or separation between the reflective layers, the index of refraction of the material between the reflective layers, and the effective thickness or diameter of the beam entering between the two reflective layers. Further definition of the produced line of light, or scan line, is provided by non-parallel sides which extend between the reflective surfaces. These sides permit total internal reflection, when properly angled, so that the height of the line produced on the document is less than the o diameter, or width, of the light beam directed between the reflecting surfaces.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
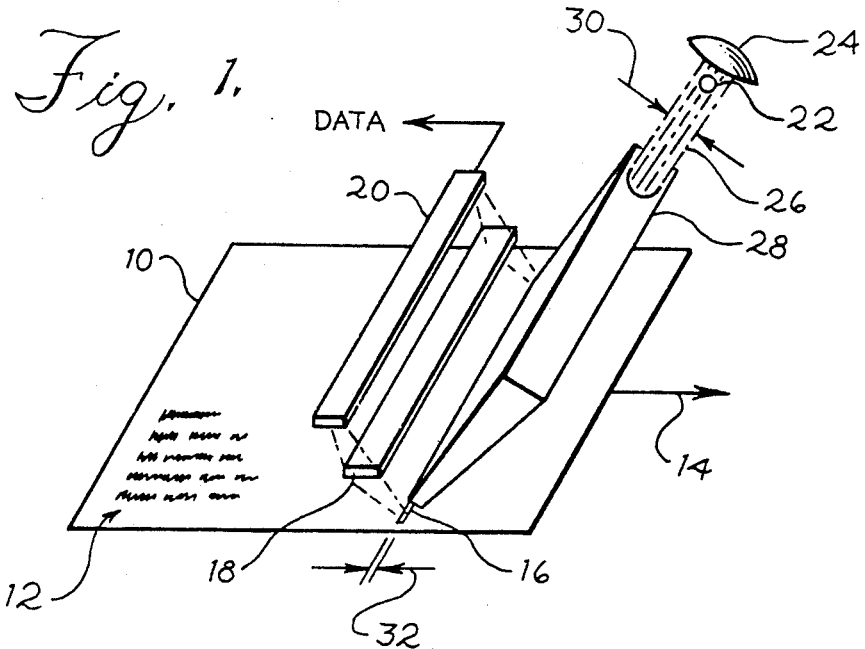
FIG. 1 is a view of a document scanner illustrating the use of the invention.

Throughout the following description, similar reference characters refer to similar elements or members in all of the figures of the drawings.

Referring now to the drawings, and to FIG. 1 in particular, there is shown some of the major components of a document line scanner constructed according to the present invention. The document 10 is being scanned by the scanner to obtain data corresponding to the indicia 12 existing on the document. The document 10 is moved in direction 14 so that all portions of the document are eventually illuminated by the line of light, or scan line 16, which is produced by the illuminating devices of the scanner. This line extends across the document 10 in a direction which is perpendicular to direction 14. Reflections from the indicia 12 illuminated by the line 16 are focused by the imaging lens 18 onto a sensor 20, such as a linear charge coupled device (CCD). The imaging lens 18 can be a graded index fiber lens or a conventional spherical lens, in which case the sensor 20 could be shorter than the length of the scan line 16. Data obtained by the sensor 20 is appropriately clocked out of the sensor and transferred to other electronic circuits of the scanner.

The illuminating line 16 is created from the illumination provided by incandescent lamp or bulb 22 which is backed by a parabolic reflector 24 to produce the beam of incoherent, incandescent light 26. This beam of light is directed into the beam directing member 28, as shown, to produce the scan line 16 on the document 10. The effective diameter of the light beam 26 is indicated by the diameter 30, in FIG. 1. Because of the condensing action of the beam directing member 28, the height 32 of the illuminated line 16 is smaller than the diameter 30 of the light beam 26. This is explained in more detail in connection with FIG. 2C.

Figures 2A, 2B:
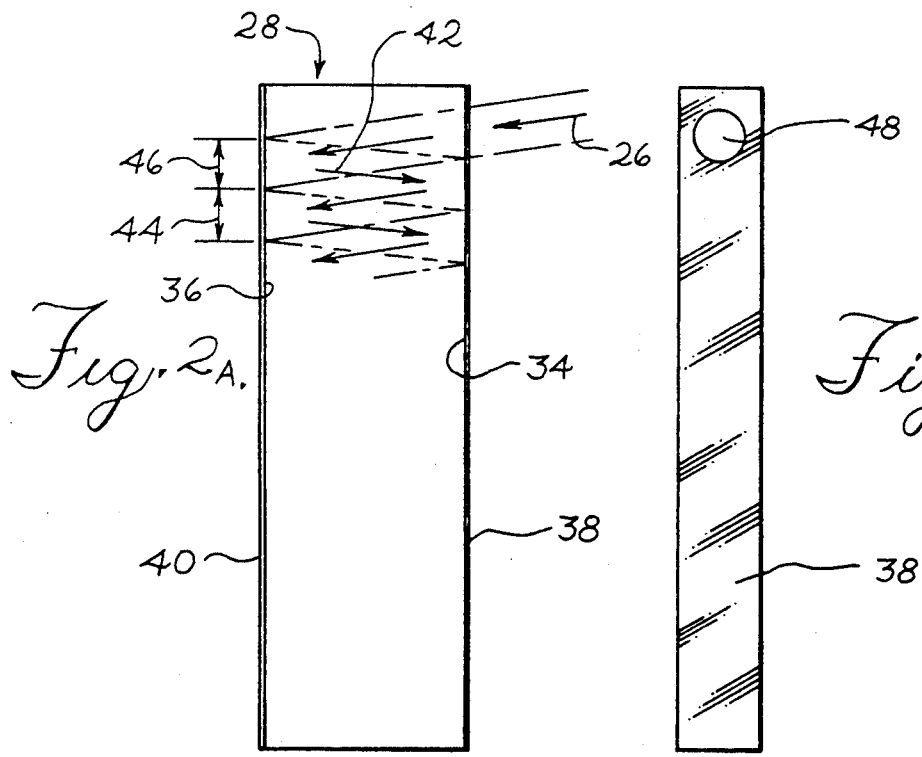
FIGS. 2A, 2B and 2C are views of a beam directing member constructed according to this invention.
Figure 2C:
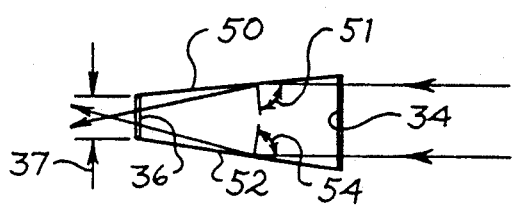

FIGS. 2A, 2B and 2C are coordinated views of the beam directing member 28 shown in FIG. 1. According to FIG. 2A. the beam directing member 28 has a major dimension, or length, extending from the end area where the beam 26 enters the member 28 to the other end of the member, or the bottom of the figure as illustrated in FIG. 2A. The beam directing member 28 may be constructed of a solid optical material, such as glass. The input surface 34 of the optical material is coated or covered with a reflective coating or layer 38. This may be an aluminized or silvered surface which is a good reflector of light energy. The member 28 also includes an output surface 36 which is parallel to the input surface 34 and is located on the other side of the member 28. A reflective layer 40 is also positioned or deposited on the output surface 36, as shown, The reflective layer 40 has a graduated or graded coefficient of reflectivity such that the reflectance decreases as the reflective layer extends away from the light entering end of the beam directing member 28. This, in effect, allows a greater percentage of the light striking the layer 40 to pass through the layer and ultimately produce the scan line.

The dashed lines and arrows in FIG. 2A generally illustrate the propagation of the light beam 26 through the member 28, although the refraction of the beam because of changes in the index of refraction of the material and the adjacent medium is not illustrated. Light beam 26, illustrated by an arrow in the center of the beam and dashed lines defining the borders of the beam width, enters the input surface 34 through a light entering region, which is best shown as region 48 in FIG. 2B. This is a region which does not have any reflective layer on the input surface so that the beam 28 can enter into the region between the input and output surfaces 34 and 36, respectively. The beam 26 is partially reflected from the reflective layer 40 and this partially reflected beam 42 is directed back to the reflective layer 38 where it is again reflected toward the reflective layer 40. Repeated reflections back and forth between the two layers for the entire length of the beam directing member 28 allows the single beam of light 26 to produce a continuous line of illumination coming through the output surface 36. Since the output reflective layer 40 is only partially reflective, some of the light energy striking the reflective layer 40 is allowed to escape the beam directing member 28 and eventually form the scan line on the document.

The geometry and orientation of the beam directing member 28 and the incident light beam 26 is such that the height of the reflected beams, such as the height 44, is equal to the height of the beam before any reflections, such as the height 46. In addition, the location of the reflected beams on the output surface 36 are adjacent to each other so that a continuous line of light is produced by the beam directing member 28. This is made possible by the use of an incandescent light beam 26 rather than a coherent light source from a laser. If the light beam 26 was produced by a laser, destructive interference would occur at the borders where the beams are adjacent to each other on the output surface 36. This would produce a non-continuous line which would give inaccurate results in the scanning operation. However, the incoherent nature of the light beam 26 prevents sharp and defined destructive interference at these border regions and a smooth, continuous line of light is produced by the beam directing member 28 according to this invention.

FIG. 2C illustrates the shape of the beam directing member 28 when looking at the bottom of the member. The member includes non-parallel sides 50 and 52 which extend between the input and output surfaces 34 and 36, respectively. These sides are not covered with reflective layers as are the input and output surfaces. However, because of the angle of incidence of the arriving light beam, total internal reflection takes place and the rays of the light are condensed or diverted into the smaller output surface height dimension 37. Of course, there would be no redirecting of the light in the height direction, thereby leaving the beam heights (44 and 46 in FIG. 2A) the same as the entering beam. Angles 51 and 54 indicate the angles of incidence of the rays of the light beam as they strike the sides 50 and 52 of the beam directing 28. As long as these angles exceed the critical angle, which is a function of the index of refraction of the material constructing the member 28 and the surrounding medium, the light rays are conveniently condensed to the smaller area defined by the output surface 36. This total internal reflection can also aid in keeping light energy from leaving the member 28 during the repeated reflections down through the member 28.

Figure 3:
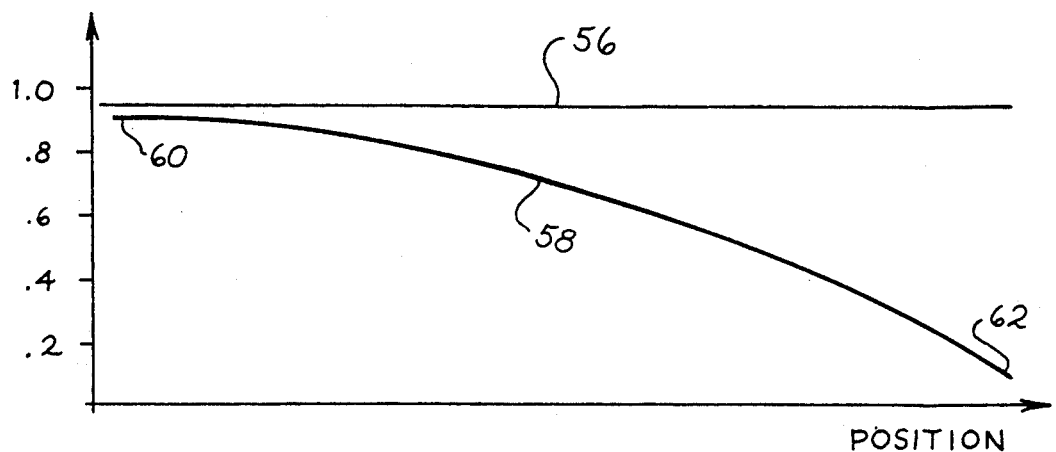
FIG. 3 is a graph illustrating the reflectances of opposing surfaces on the beam directing member.

FIG. 3 is a graph illustrating the reflectance of the opposing surfaces on the beam directing member 28. According to FIG. 3, curve 56 represents the reflectance, or the coefficient of reflectivity, of the reflective layer 38 on the input surface of the beam directing member. As can be seen, the reflectance is close to 1.0 (or 100%) regardless of position across the entire length of the beam directing member. In other words, the reflectivity remains constant regardless of the position of the reflective layer, and the light beams striking this layer are substantially totally reflected back toward the output surface of the beam directing member. On the other hand, curve 58 represents the reflectance of the reflective layer 40 on the beam directing member 28. As can be seen, this reflectance is highest at the end 60 which corresponds to the end near the light entering region 48. The reflectance decreases, according to a predetermined rate, to a small value at the end 62, which corresponds to the end furthest from the light entering region. It should be appreciated that in order for the output light to be substantially constant across the entire length of the beam directing member 28, the reflectance needs to be less at the far end of the member to permit the escape of more of the reflected light still remaining within the beam directing member.

The shape of the curve 58 in FIG. 3, and thus the reflectance of the output layer 40, can be determined mathematically by considering the amount of light striking the semi-reflective layer 40. The initial light leakage at the output surface can be represented by the equation:

$$S_1 = L(1 - r_1) \quad (1)$$

where $S_1$ is the light passing through the first region of layer 40 to produce the scan line, L is the light entering the beam directing member and striking the reflective layer 40, and r is the coefficient of reflectivity of layer 40 at this position. The reflected light back toward the input reflective layer 38 is represented by the equation:

$$R_1 = L r_1 \quad (2)$$

The light (L') then reflected from the input reflective layer is given by the equation:

$$L' = L r_1 (0.98) \quad (3)$$

assuming that the reflectance of the substantially totally reflecting layer 38 is 0.98 (or 98%). The light passing through the layer 40 to produce the scan line at the second position ($S_2$) is given by the equation:

$$S_2 = L r_1 (0.98)(1 - r_2) \quad (4)$$

Since $S_1$ and $S_2$ must be equal for the line illumination to be continuous and equal throughout the length of the line, equations (1) and (4) can be combined to provide the following:

$$L\, r_1 (0.98)(1 - r_2) = L(1 - r_1) \quad (5)$$

Equation (5) can be solved for the required reflectance ($r_2$) of the output reflective layer at this second position which gives the same amount of light output. This produces equation (6).

$$r_2 = 1 - (1 - r_1)/r_1(0.98) \quad (6)$$

Continued calculations of this type can be used to determine the reflectance of the output layer 40 for the remaining length of the beam directing member. The result can be represented graphically by the curve 58 of FIG. 3. In actual construction, the surfaces of the optical material, once cut, ground and polished to size, are sputtered with aluminum to give the desired reflectance variation. The varying reflectance is achieved by controlling the sputtering time at a given region. The longer the sputtering time, the thicker the reflective layer and the more reflectance it exhibits. Another technique which may be used is a mask which is driven by a stepper motor to control the exposure time of different regions of the reflective layer.

Figure 4:
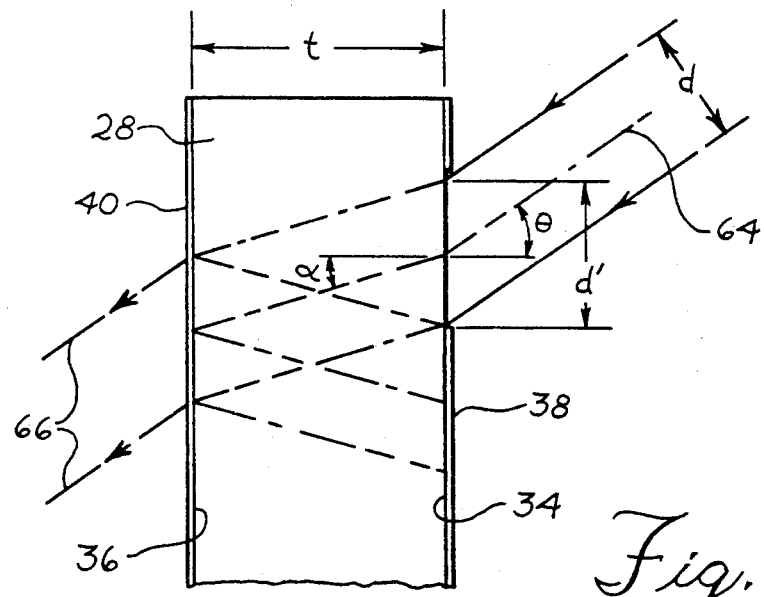
FIG. 4 is a diagram illustrating various quantities used in determining the geometry of a beam directing member constructed according to the teachings of this invention.

FIG. 4 is a diagram illustrating the path of the beam rays as they progress through the beam directing member 28. As already indicated, using a coherent light beam, such as a laser beam, in combination with adjacent output positions on the output surface to provide a continuous line of illumination, can produce destructive interference at the junctions of adjacent beams. These regions cause discontinuities in the line of illumination which can degrade the scanners performance. The present invention includes means for directing an incoherent light beam into a plurality of adjacent incoherent light beams which form a continuous line of illumination across a portion of an output surface. By using an incoherent light source, and by aligning the beam according to specific criteria, the multiple reflected light beams will project out of the beam directing member at adjacent positions without destructive interference to provide a solid and continuous illumination line. The criteria necessary to provide this desired performance is indicated by the parameters shown in FIG. 4.

The angle $\theta$ represents the angle of incidence of the center line 64 of the light beam which enters between the two opposing surfaces of the beam directing member 28. The diameter (d) of the light beam and the diameter (d') projected on the input surface 34 are related by the expression:

$$d' = d/\cos \quad (7)$$

Due to the index of refraction (N) of the material comprising the beam directing member 28, the entering light beam is defracted as it passes through the surface 34. The angle by which the defracted beam propagates through the optical material is given by the equation:

$$\alpha = \sin^{-1}([\sin \theta]/N) \quad (8)$$

This leads to the equation:

$$\tan \alpha = (d'/2)/t = d/(2t \cos \theta) \quad (9)$$

By substituting equation 8 into equation 9, the relationship between the indicated parameters is indicated by the equation:

$$\tan[\sin^{-1}([\sin \theta]/N)] = d/(2t \cos \theta) \quad (10)$$

Equation 10 can be solved for the angle $\theta$ to determine the angle at which the incoherent light beam must meet the input surface of the beam directing member 28 to provide the continuous and adjacent light output at the output surface 36. Any substantial deviation of the entering light beam from the angle $\theta$ would cause the light beams to either overlap or have a gap therebetween. This would cause the produced line of light to be non-uniform and much less desirable.

It is emphasized that numerous changes may be made in the above-described system without departing from the teachings of the invention. For example, the illumination system may be used to scan an object or structure rather than a document, the light entering region may be at a location other than on the input surface, and the beam directing member may be constructed without a solid optical material filling the region between the reflecting surfaces. Line uniformity can be further improved by using a diffusing element, such as an optical grating, in the light exit path between the beam directing member and the document. In applications where it is desirable to illuminate the document ends more brightly than the center, the curve for the reflectance of the output layer can be modified accordingly. It is intended that all of the matter contained in the foregoing description, or shown in the accompanying drawings, shall be interpreted as illustrative rather than limiting.

What is claimed is:

1. Illumination apparatus for producing a substantially continuous line of light on a scanned member to facilitate the detection of indicia present on the scanned member by a scanning device, said illumination apparatus comprising:

means for producing a beam of incoherent light;

a beam directing member having an input surface and an output surface which are spaced from and substantially parallel to each other;

a light entering region on the beam directing member whereby the incoherent light beam is directed between the two surfaces;

an input reflective layer located on the input surface to substantially totally reflect light toward the output surface;

an output reflective layer located on the output surface to partially reflect light toward the input surface and partially allow light to pass through the output reflective layer and the output surface, with the reflectance of the output reflective layer being graded across the length of the beam directing member to produce less reflection as the reflective layer extends away from the light entering region; and means for directing the incoherent light beam into a plurality of adjacent incoherent light beams which form a continuous line of illumination across a portion of an output surface, 2. The illumination apparatus of claim 1 wherein the incoherent light beam enters the beam directing member at an incidence angle of $\theta$ which satisfies the equation:

$$\tan[\sin^{-1}([\sin\theta]/N)] = d/(2t\cos\theta)$$

where N is the index of refraction of the beam directing member material, d is the width of the beam allowed to enter between the reflective surfaces, and t is the separation distance between the input and output surfaces, 3. The illumination apparatus of claim 1 wherein the beam of incoherent light which enters the beam directing member has a larger diameter than the height of the continuous line of light produced by the illumination apparatus, 4. The illumination apparatus of claim 1 wherein the beam directing member includes first and second sides which extend between the input and output surfaces, said first and second sides being non-parallel to each other and separated from each other a shorter distance at the output surface than at the input surface.

5. The illumination apparatus of claim 4 wherein the beam directing member is constructed of a solid optical material which fills the entire volume between the two sides and the two surfaces.

6. The illumination apparatus of claim 5 wherein the input and output surface reflective layers are deposited on the outside of the optical material.

7. The illumination apparatus of claim 5 wherein the angles the sides make with the incoherent light beam are greater than a critical angle which must be exceeded to allow total internal reflection of the beam from the sides.

8. Illumination apparatus for producing a substantially continuous line of light on a scanned member to facilitate the detection of indicia present on the scanned member by a scanning device, said illumination apparatus comprising:

means for producing a beam of incoherent light;

a beam directing member having input and output surfaces which are spaced from each other, and first and second sides which are non-parallel to each other and which extend between the two surfaces;

total reflective means located on the input surface for substantially totally reflecting light within the beam directing member toward the output surface;

partial reflective means located on the output surface to partially reflect light within the beam directing member toward the input surface and partially allow light to pass through the partial reflective means, with the reflectance of the partial reflective means being graded across the length of the beam directing member; and means for permitting the incoherent light beam to project into the region between the two surfaces for being repeatedly reflected between the two reflective means, with said light beam projecting into the beam directing member at an incidence angle of $\theta$ which satisfies the equation:

$$\tan[\sin^{-1}([\sin\theta]/N)] = d/(2t\cos\theta)$$

where N is the index of refraction of the beam directing member material, d is the width of the beam allowed to enter between the two reflective surfaces, and t is the separation distance between the input and output surfaces, said incoherent light beam being directed into a plurality of adjacent incoherent light beam which form a continuous line of illumination across a portion of an output surface.

9. The illumination apparatus of claim 8 wherein the beam directing member includes first and second sides which extend between the input and output surfaces, said first and second sides being non-parallel to each other and separated from each other a shorter distance at the output surface than at the input surface.

10. Illumination apparatus for producing a substantially continuous line of light on a scanned member to facilitate the detection of indicia present on the scanned member by a scanning device, said illumination apparatus comprising:

an incandescent light source for producing a beam of incoherent light;

a solid, wedged-shaped, beam directing member constructed of an optical material having an index of refraction equal to N, said member having an input surface and an output surface which are spaced from each other by a distance t and are substantially parallel to each other, with the height of the input surface being greater than the height of the output surface;

a light entering region on the input surface of the beam directing member;

means for directing the incoherent light beam into a plurality of adjacent incoherent light beams which form a continuous line of illumination across a portion of an output surface, wherein said light beam meets the input surface at an angle of incidence of $\theta$ which satisfies the equation:

$$\tan[\sin^{-1}([\sin\theta N)] = d/(2t\cos\theta)$$

where d is the with of the beam allowed to enter between the two surfaces;

an input reflective layer located on the outside of the input surface to substantially totally reflect light within the optical material toward the output surface; and an output reflective layer located on the outside of the output surface to partially reflect light through the optical material toward the input surface and partially allow light to pass through the output reflective layer and the output surface, with the reflectance of the output reflective layer being graded across the length of the beam directing member to produce less reflection as the reflective layer extends away from the light entering region, said beam directing member also having first and second side which extend between the input and output surfaces, with the sides being non-parallel to each other and separated from each other a sufficiently shorter distance at the output surface than at the input surface such that the sides make angles with the incoherent light beam which are greater than a critical angle which must be exceeded to allow total internal reflection of the beam from the sides.

* * * * *